(12) United States Patent
Reed et al.

(10) Patent No.: US 11,473,723 B2
(45) Date of Patent: Oct. 18, 2022

(54) TRIGGER-ACTUATED GREASE APPLICATOR

(71) Applicant: DUALCO, INC., Houston, TX (US)

(72) Inventors: D. L. Whitney Reed, Houston, TX (US); Henry A. Hill, Jr., Tucson, AZ (US); Israel Rodriguez, Houston, TX (US)

(73) Assignee: Dualco, Inc., Houston, TX (US)

( * ) Notice: Subject to any disclaimer, the term of this patent is extended or adjusted under 35 U.S.C. 154(b) by 0 days.

(21) Appl. No.: 16/573,764

(22) Filed: Sep. 17, 2019

(65) Prior Publication Data

US 2020/0088348 A1 Mar. 19, 2020

Related U.S. Application Data

(60) Provisional application No. 62/732,398, filed on Sep. 17, 2018.

(51) Int. Cl.
*F16N 5/02* (2006.01)
*B05C 17/005* (2006.01)
*F16N 3/12* (2006.01)

(52) U.S. Cl.
CPC .......... *F16N 5/02* (2013.01); *B05C 17/00576* (2013.01); *F16N 3/12* (2013.01)

(58) Field of Classification Search
CPC ........ F16N 5/02; F16N 3/12; B05C 17/00576
USPC ...................................................... 222/326
See application file for complete search history.

(56) References Cited

U.S. PATENT DOCUMENTS

| | | | | |
|---|---|---|---|---|
| 2,113,333 A | * | 4/1938 | Piquerez ................ | F16N 37/02 222/260 |
| 2,409,619 A | * | 10/1946 | Fitch ...................... | F16N 3/12 222/386 |
| 2,505,839 A | * | 5/1950 | Scovell .................. | F16N 3/12 222/262 |
| 3,209,957 A | * | 10/1965 | Sundholm ............. | F16N 3/12 222/340 |
| 3,384,081 A | * | 5/1968 | Castiglione ........... | A61M 5/204 604/183 |
| 4,142,654 A | * | 3/1979 | Doubleday ........... | B05B 9/0426 222/309 |
| 5,542,581 A | * | 8/1996 | Habora ................. | B05B 11/0037 222/331 |
| 5,743,431 A | * | 4/1998 | Brattesani ............. | B05C 17/01 222/1 |
| 5,779,105 A | * | 7/1998 | Brown ................... | F16N 3/12 222/262 |
| 5,884,818 A | * | 3/1999 | Campbell ............. | B05C 17/00576 222/256 |
| 5,984,149 A | * | 11/1999 | Thanisch ............. | B05B 11/007 222/340 |
| 6,494,347 B1 | * | 12/2002 | Yeh ....................... | F16N 3/12 184/105.2 |
| 7,337,927 B2 | * | 3/2008 | Linkletter ............. | F16N 3/12 184/105.2 |

* cited by examiner

*Primary Examiner* — Vishal Pancholi
(74) *Attorney, Agent, or Firm* — Gray Reed & McGraw LLP

(57) ABSTRACT

A hand-held lubrication device that allows for both one- and two-handed operation. The device utilizes a front-facing mounted trigger that actuates a rear-mounted plunger via two tie rods.

7 Claims, 7 Drawing Sheets

TRIGGER-ACTUATED GREASE APPLICATOR

CITATION TO PRIOR APPLICATIONS

The present application claims priority to U.S. Provisional Application No. 62/732,398, titled "TRIGGER-ACTUATED GREASE APPLICATOR" and filed Sep. 17, 2018.

BACKGROUND OF THE INVENTION

The present invention is directed to a handheld trigger-actuated grease applicator. Unlike prior art handheld grease applicators, or grease guns, the present invention allows for improved control, flexibility, and ease of use.

Grease guns of the prior art primarily rely on direct manual depression of a plunger to dispense grease from an attached canister to a target site providing few means to accurately stabilize and maintain control of the grease gun during use. While some prior art grease guns feature trigger-actuation, these triggers similarly apply force directly to the plunger and result in a reduced ability, relative to the present invention, to maximize force applied to the plunger mechanism as access to the plunger is prohibited by the trigger itself.

The present invention improves over the prior art, particularly with respect to the ability to dispense lubricants having higher viscosity, due to its innovative trigger configuration that both takes advantage of a head-unit-mounted fulcrum, which maintains efficient application of manual force to the plunger via trigger actuation, and an exposed plunger that itself may be directly acted upon to apply additional force.

DETAILED DESCRIPTION OF THE INVENTION

This description, with references to the figures, presents non-limiting examples of embodiments of the present invention.

Figure 1:
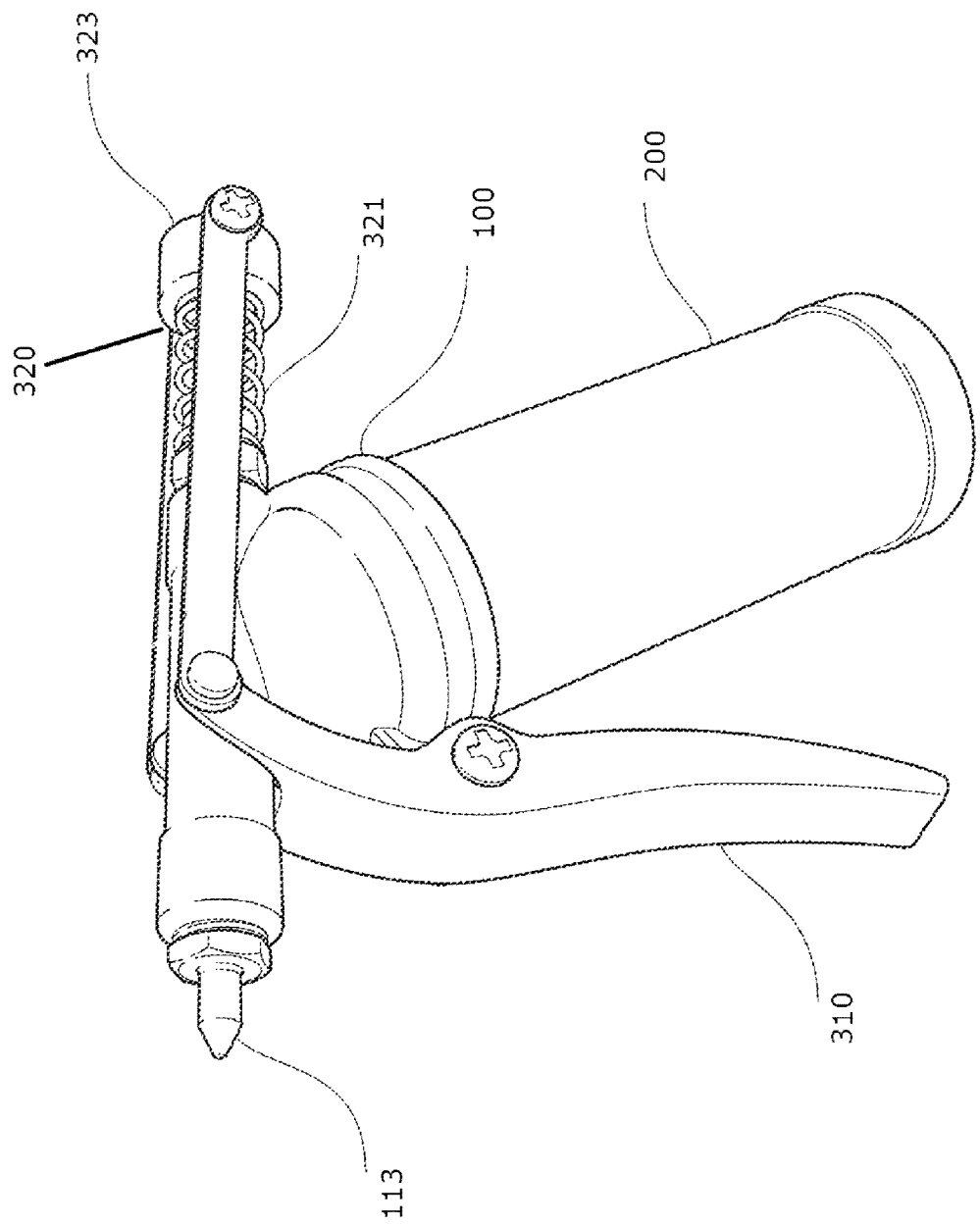
FIG. 1 is a right perspective view of one embodiment of the present invention.
Figure 2:
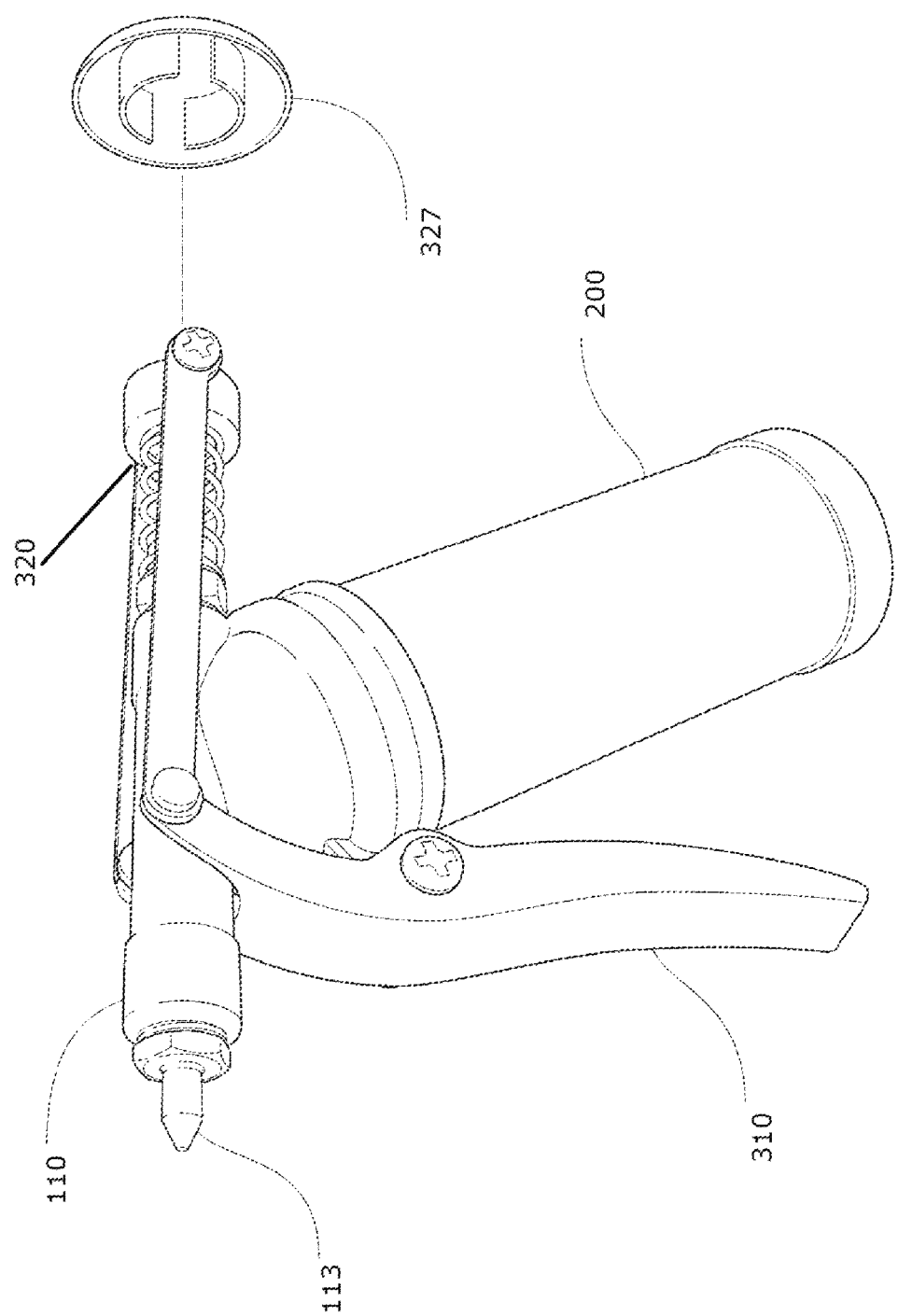
FIG. 2 is a right perspective view of an alternative embodiment of the present invention.

In certain embodiments, such as that depicted in FIG. 1, the present invention comprises a cast head unit 100, a container body 200 for holding lubricant, and an actuation mechanism 300. A substantially hollow and cylindrical body is formed at the top of head unit 100 to create an angled passageway 110 with a first end 111 that is oriented upward relative to a second end 112. Angled passageway 110 is capable of mounting a nozzle tip 113 on said first end 111 and of having a plunger 320 inserted and secured into said second end 112. While container body 200 is described and depicted as a having substantially cylindrical body, persons of ordinary skill in the art would recognize that other containers, such as those utilized in grease guns or other lubricant applicators, known in the art may be used. Similarly, plunger 320 may be a plunger otherwise known in the art though being modified to allow coupling to other components of actuation mechanism 300 as described herein. Additionally, angled passageway 110 may be configured to communicate lubricant in response to actuation of plunger 320 in any manner known in the art.

In such embodiments, head unit 100 further comprises a molded actuator attachment point 120 placed below said first end 111. Container body 200 is substantially cylindrical in shape and is configured to be secured to said head unit 100. Head unit 100 and container body 200 may be composed of any metal or plastic known in the art for such uses including zamak alloy. Molded actuator attachment point 120 may be a cast pivot boss, a strap-on boss, or any other structure known in the art that can secure a surface designed to pivot around a base structure. Nozzle tip 113 may be one of various nozzle tips known in the art for use with grease guns. In other embodiments, nozzle tip 113 may instead be a nozzle connector fitting configured for quick connection and coupling with various nozzle types through techniques known in the art. The material contained in container body 200 may be grease or any other lubricant of varying viscosity. Certain further embodiments may also include a zerk fitting (hydraulic-type) 131 (in shown in FIG. 7), or other similar fittings known in the art, to facilitate refilling of container body 200.

Figure 3:
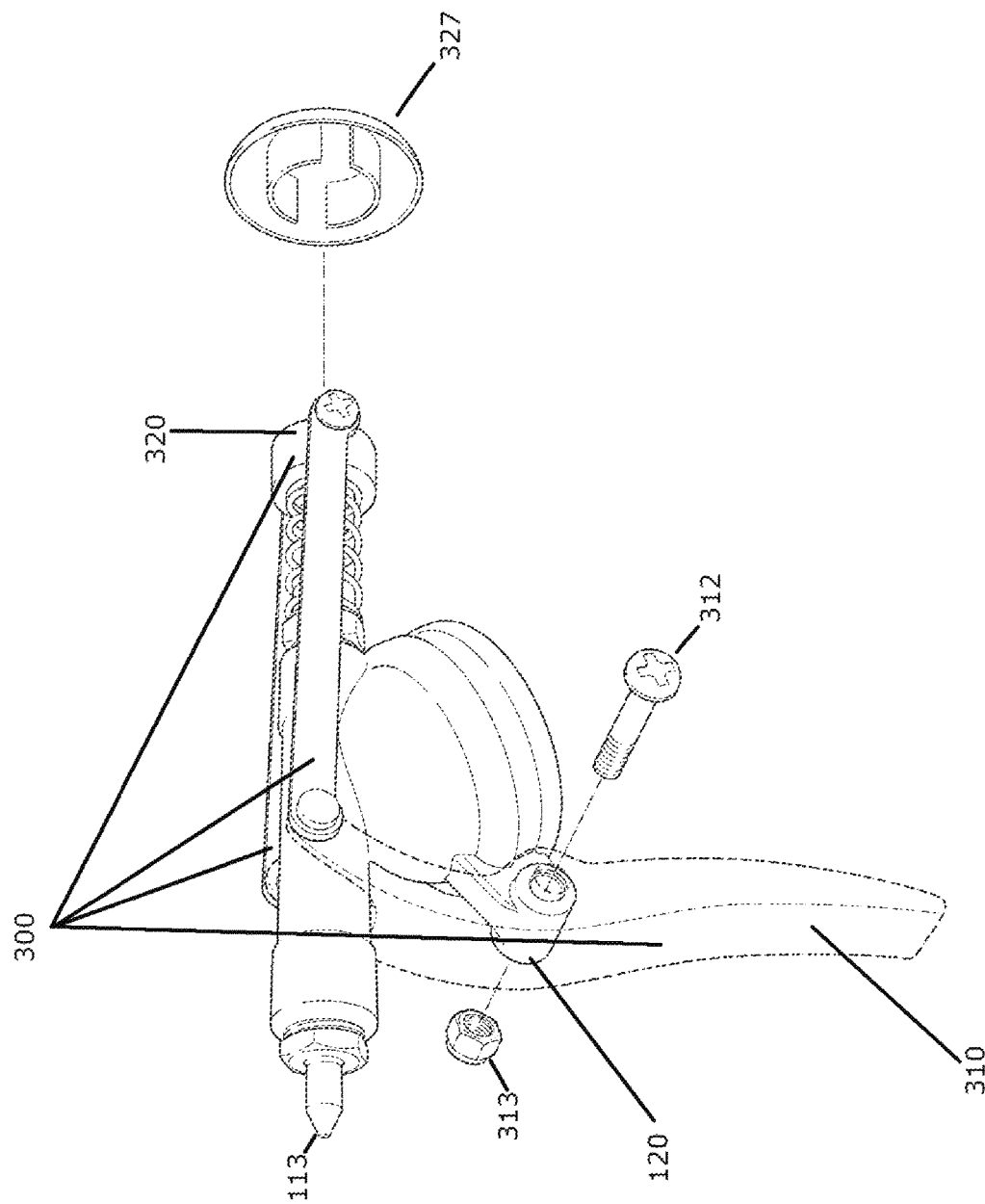
FIG. 3 is a partially exploded view of the trigger mechanism in one embodiment of the present invention.
Figure 4:
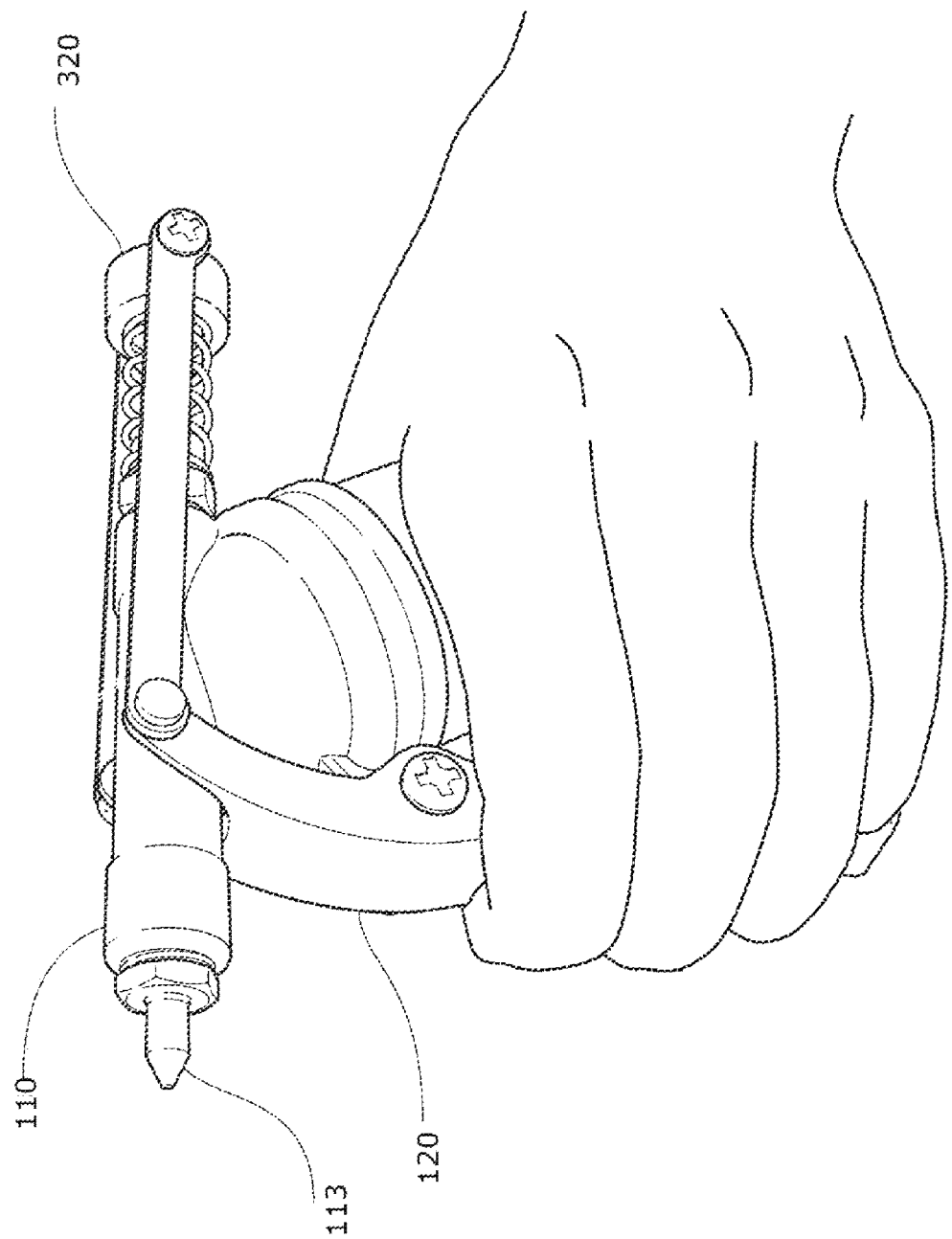
FIG. 4 is a right perspective view of one embodiment of the present invention during operation.
Figure 5:
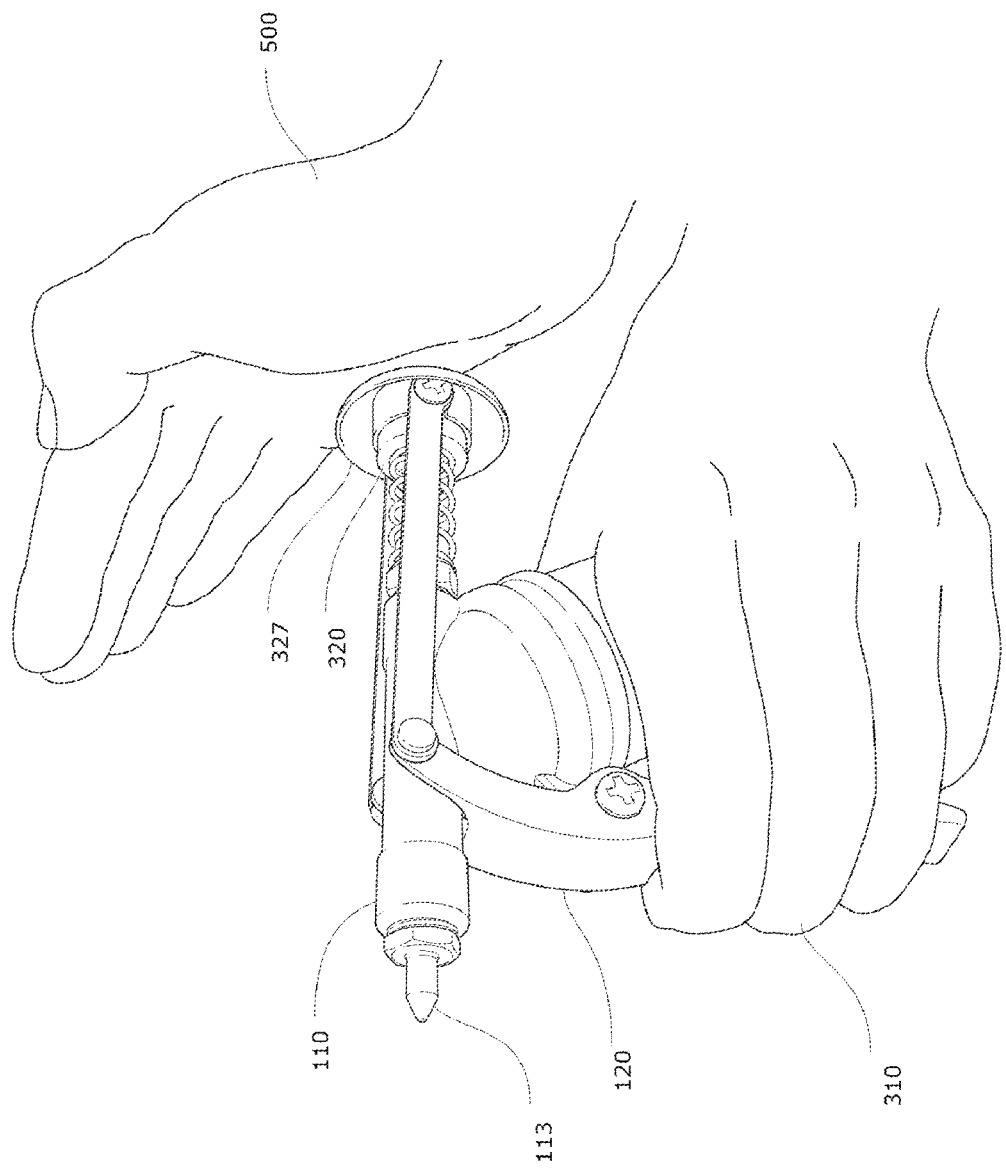
FIG. 5 is a right perspective view of an alternative embodiment of the present invention during operation.
Figure 6:
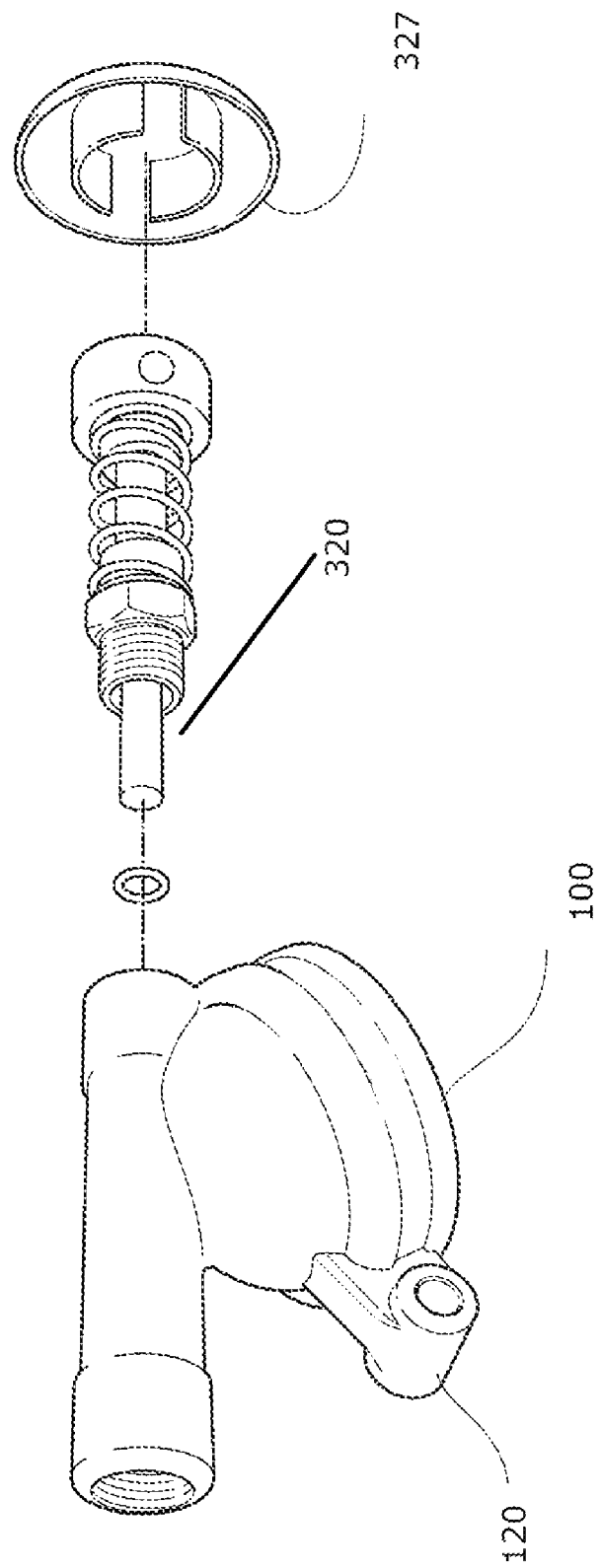
FIG. 6 is a right perspective view of a casted head unit of one embodiment of the present invention.

As shown in FIG. 3, actuation mechanism 300 is secured to angled passageway 110 at molded actuator attachment point 120 in one embodiment of the present invention. When actuated through pulling (shown in FIG. 4), actuation mechanism 300 causes plunger 320 to be pressed inward from second end 112 of angled passageway 110 toward first end 111 which then results in lubricant flowing via vacuum pressure from container body 200 through angled passageway 110 and ultimately through mounted nozzle tip 113. In certain embodiments, actuation mechanism 300 comprises a trigger or lever 310 formed from a shaped piece of a substantially rigid material, including those materials used in the fabrication of head unit 100 and container body 200, and two tie rods—a first tie rod 330 and a second tie rod 340. The two tie rods are secured to both trigger 310 and plunger 320 on opposing sides of angled passageway 110. As depicted in FIGS. 1 and 4, the tie rods serve to operably couple trigger 310 and plunger 320 thereby allowing for manual force acted upon trigger 310 in one direction to be applied to plunger 320 in a parallel, but opposing direction and to secure plunger 320 within second end 112 of angled passageway 110. These embodiments, wherein actuation mechanism 300 is secured to a fulcrum at molded actuator attachment point 120 and having said tie rods connecting trigger 310 to plunger 320 in the manner described above, improves ease and user comfort in actuating the trigger by providing for simple, one-handed use of the embodied invention.

Figure 7:
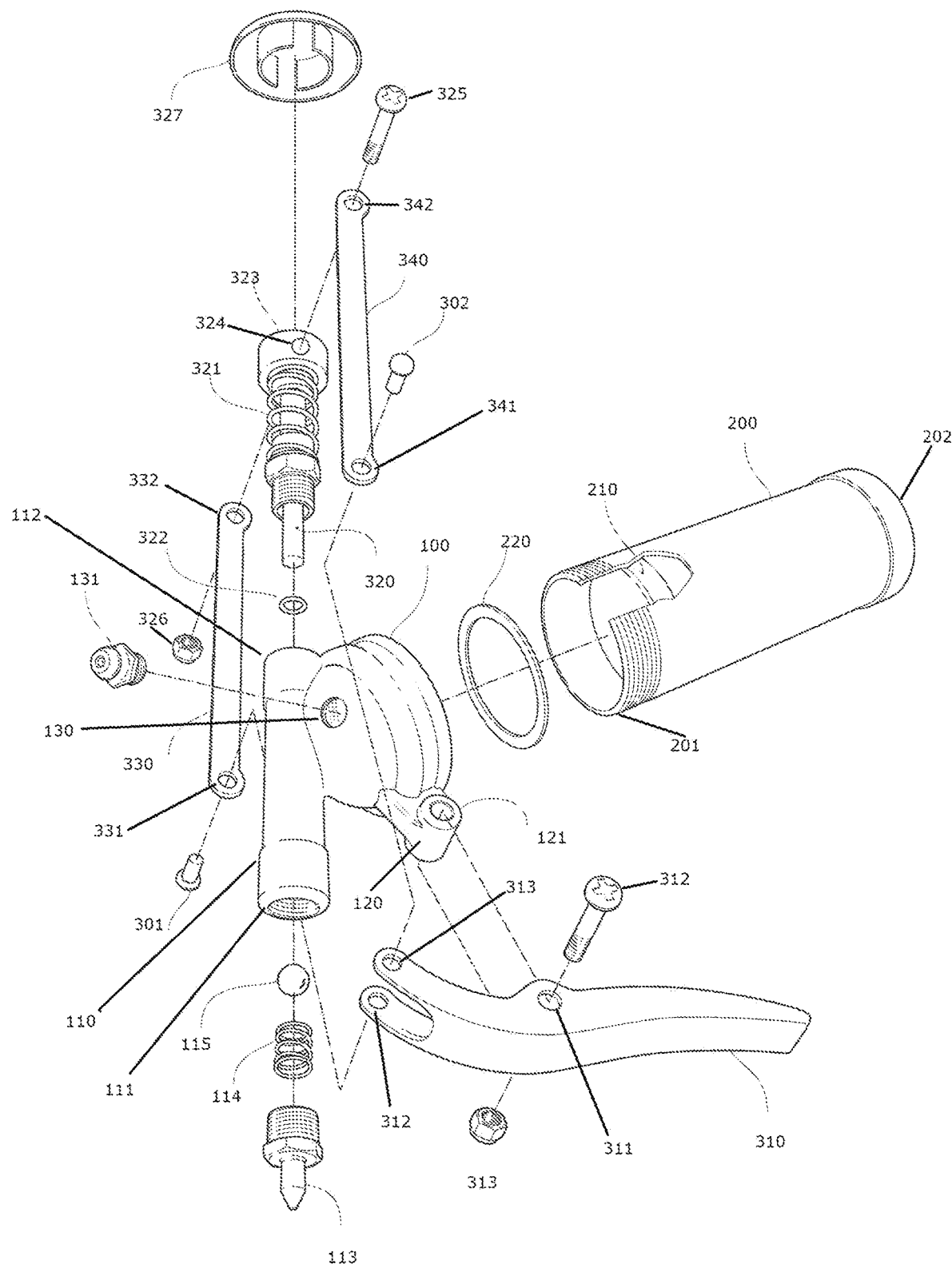
FIG. 7 is an exploded view of one embodiment of the present invention.

One embodiment incorporating many of the features previously discussed can be seen in FIG. 7. Trigger bolt 312 is inserted through a first trigger opening 311 and an attachment point opening 121. When secured by trigger nut 313, trigger bolt 312 further secures trigger 310, of actuation mechanism 300, to molded actuator attachment point 120 and allows for trigger 310 to pivot around molded actuator attachment point 120 when pulled.

Container body 200 is substantially cylindrical in shape having a top end 201 that is open and, in this embodiment, threaded for engagement with head unit 100. Head unit 100 includes a refilling port 130 through which additional lubricant may be transferred into container body 200. In this embodiment, a zerk fitting 131 is shown for installation into refilling port 130. A bottom end 202 of container body 200 may be entirely closed or, in alternative embodiments, contain a rod-opening that allows for insertion or attachment of a push-rod (as known in the art) to facilitate lubricant movement. Container body 200 also contains, as shown in a cutaway section, base seal 210 that is initially located at bottom end 202 and is configured to travel upward toward open top end 201 as lubricant is communicated from container body 200 through nozzle tip 113. As those skilled in the art would recognize, base seal 210 may be composed of any material, such as those utilized in known grease gun systems, that facilitates the creation of a seal in container body 200 and allows for upward movement during operation as discussed above. Head unit 100 may also contain head seal 220, depicted as a gasket, to minimize lubricant leakage at the junction of head unit 100 and container body 200.

First end 111 of angled passageway 110 is threaded for engagement with nozzle tip 113. Nozzle spring 114 and ball stop 115 are located within angled passageway 110 and configured to facilitate lubricant transfer from container body 200 that results from actuation of plunger 320. Plunger 320, of actuation mechanism 300, includes a plunger spring 321 configured to return plunger 320 to an unactuated state when trigger 310 is released. Plunger seal 322, shown as an O-ring, may also be installed on plunger 320 when inserted into angled passageway 110 to minimize lubricant leakage along plunger 320 during use. At an outer end 323, plunger 320 has a tie rod attachment point 324, embodied here as a plunger bolt passageway, through which the two tie rods may be secured.

First tie rod 330, of actuation mechanism 300, is coupled to trigger 310 via a first rivet 301 secured at a first tie rod first end 331 through a first trigger rod attachment point 312. Second tie rod 340, of actuation mechanism 300, is coupled to trigger 310 via a second rivet 302 secured at a second tie rod first end 341 through a second trigger rod attachment point 313. Plunger bolt 325 is insert through a second tie rod second end 342, tie rod attachment point 324, and a first tie rod second end 332. A plunger nut 326 secures plunger bolt 325 thereby securing the two tie rods to plunger 320.

Additionally, while users may more typically operate the present invention with one hand, further embodiments as shown in FIGS. 2, 3, and 5-7 also contemplate two-handed operation. For example, a user may, while actuating trigger 310 with as they would during one-handed use, apply additional force directly 500 to outer end 323 of plunger 320 with a second hand. As a result, not only is ease of use improved under this embodiment of the present invention but also the ability to accommodate the dispensing of higher viscosity lubricants. In such embodiments, a plunger cover 327 is placed on outer end 323 of plunger 320 to increase user comfort when applying force directly to plunger 320.

In certain embodiments, molded actuator attachment point 120 may be placed in different locations on the head unit to influence the amount of force applied to the plunger when the trigger is actuated. In further embodiments, trigger 310 may be secured to molded actuator attachment point 120 at different locations along the length of trigger 310 to allow for variable amounts of manual force to be applied to the plunger when trigger 310 is actuated. Additionally, different trigger shapes may be utilized to similarly manipulate the amount of manual force applied to the plunger when trigger 310 is actuated.

Although the invention has been explained in relation to various embodiments thereof, it is to be understood that many other possible modifications and variations can be made without departing from the spirit and scope of the invention.

The invention claimed is:

1. A hand-held lubrication device comprising:
 a head unit comprising:
  a passageway wherein a first end of said passageway is configured for engagement with a lubricant nozzle;
  an actuator attachment point;
 a container body for housing a lubricant and configured for engagement with said head unit;
 an actuation mechanism comprising:
  an actuator configured for engagement with said actuator attachment point;
 lubricant transfer means configured for engagement with a second end of said passageway, whereupon actuation by said actuator said lubricant transfer means is configured to cause said lubricant to be communicated from said container body to said nozzle assembly, wherein said actuator is positioned substantially opposite said second end of said passageway relative said head unit and substantially adjacent to said first end of said passageway relative said head unit; and
 an end cap configured for engagement with said lubricant transfer means, wherein said end cap provides increase surface area relative to the surface of said lubricant transfer means against which force can be applied substantially directly to said lubricant transfer means.

2. A hand-held lubrication device comprising:
 a head unit comprising:
  a passageway wherein a first end of said passageway is configured for engagement with a lubricant nozzle;
  an actuator attachment point;
 a container body for housing a lubricant and configured for engagement with said head unit;
 an actuation mechanism comprising:
  an actuator configured for engagement with said actuator attachment point; lubricant transfer means configured for engagement with a second end of said passageway, whereupon actuation by said actuator said lubricant transfer means is configured to cause said lubricant to be communicated from said container body to said nozzle assembly, wherein said actuator is positioned substantially opposite said second end of said passageway relative said head unit and substantially adjacent to said first end of said passageway relative said head unit, wherein said actuator is configured to pivot around said actuator attachment point when applying a force to said actuator in a first direction; and
 a first actuation arm coupled to said actuator and said lubricant transfer means, wherein said first actuation arm is configured to move in a second direction that is substantially opposite said first direction when said force is applied to said lever.

3. The device of claim 1 wherein said head unit further comprises a lubricant transfer opening that allows access to an interior volume of said container body.

4. The device of claim 1 wherein said first end of said passageway is further configured for engagement with a nozzle connector, wherein said nozzle connector is configured for engagement with a plurality of lubricant nozzle tips.

5. The device of claim 1 wherein said head unit is cast of zamak alloy.

6. The device of claim 2 wherein said actuator is a lever.

7. The device of claim 2 wherein said actuation mechanism further comprises:
   a second actuation arm coupled to said actuator and said lubricant transfer means, wherein said second actuation arm is configured to move in said second direction when said force is applied to said lever.

* * * * *